INVENTORS
ROBERT J. FOLLEN
BAARD H. THUE
BY Charles J. Ungernach
ATTORNEY

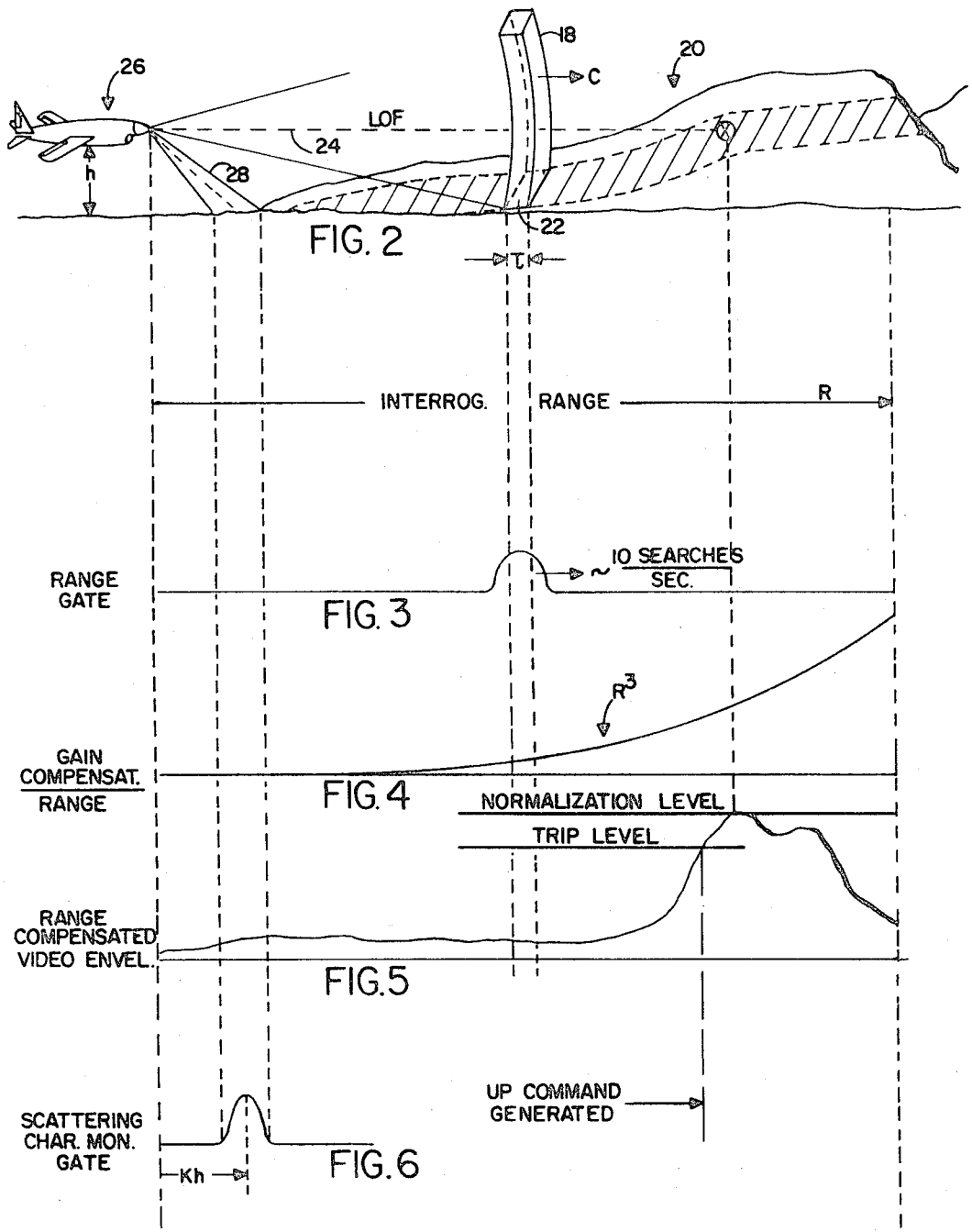

United States Patent Office 3,467,961
Patented Sept. 16, 1969

3,467,961
TERRAIN WARNING RADAR WITH SIDE LOBE GAIN CONTROL
Robert J. Follen and Baard H. Thue, Minneapolis, Minn., assignors to Honeywell Inc., Minneapolis, Minn., a corporation of Delaware
Filed Dec. 27, 1967, Ser. No. 693,847
Int. Cl. G01s 9/06
U.S. Cl. 343—7      6 Claims

ABSTRACT OF THE DISCLOSURE

A terrain warning system for an aircraft. The system comprises a pulsed radar having an antenna with a side lobe pattern as well as a main lobe pattern where the side lobe is used for monitoring the backscattering characteristic of the terrain, and the gain of a receiver in the system is automatically adjusted in accordance therewith to make the system output independent of the backscattering characteristic. The terrain is interrogated with the main lobe of the antenna and the backscattered energy from the terrain is electronically scanned to provide a warning signal when the line of flight of the aircraft intercepts the terrain.

BACKGROUND OF THE INVENTION

The invention generally pertains to radio wave communications and particularly pertains to reflected or returned wave systems, for example, object detection systems, such as radar. More particularly, the subject matter of the claimed invention is a radar, terrain warning and avoidance system for an aircraft.

The mechanization of the system is relatively simple and low in cost and the system is particularly useful in helicopters and unmanned drones.

SUMMARY

The invention is in a system comprising a radar transmitter, antenna, and receiver. The antenna is fixed and generally aligned with the LOF (line of flight) of the aircraft it is mounted on and has a main lobe pattern and a side lobe pattern. Energy from the main lobe pattern is incident upon the terrain forward and along the LOF of the aircraft. Energy is backscattered from the terrain and the receiver produces an output signal which is indicative of the terrain profile. The receiver by means of a range gate electronically scans the output signal of the receiver. At any particular instant only that backscattered energy received by the system which falls within the time the range gate is enabled is processed. Therefore, in effect, only a relatively small cross section of the forward terrain is scanned by the system. The gain of the receiver is compensated proportional to the normal range attenuation. This gain compensation is synchronized with the scanning rate.

The return signal from the terrain that is relatively close to the airborne vehicle is monitored by means of the side lobe pattern of the antenna. This return signal is used to automatically control the gain of the receiver as a function of the scattering characteristic of the nearby terrain. Thus the output of the receiver does not vary as a function of the terrain scattering characteristic.

BRIEF DESCRIPTION OF THE DRAWINGS

FIGURES 2, 3, 4, 5, and 6 illustrate various waveforms and signal processing within the system.

DESCRIPTION OF THE PREFERRED EMBODIMENT

Figure 1:
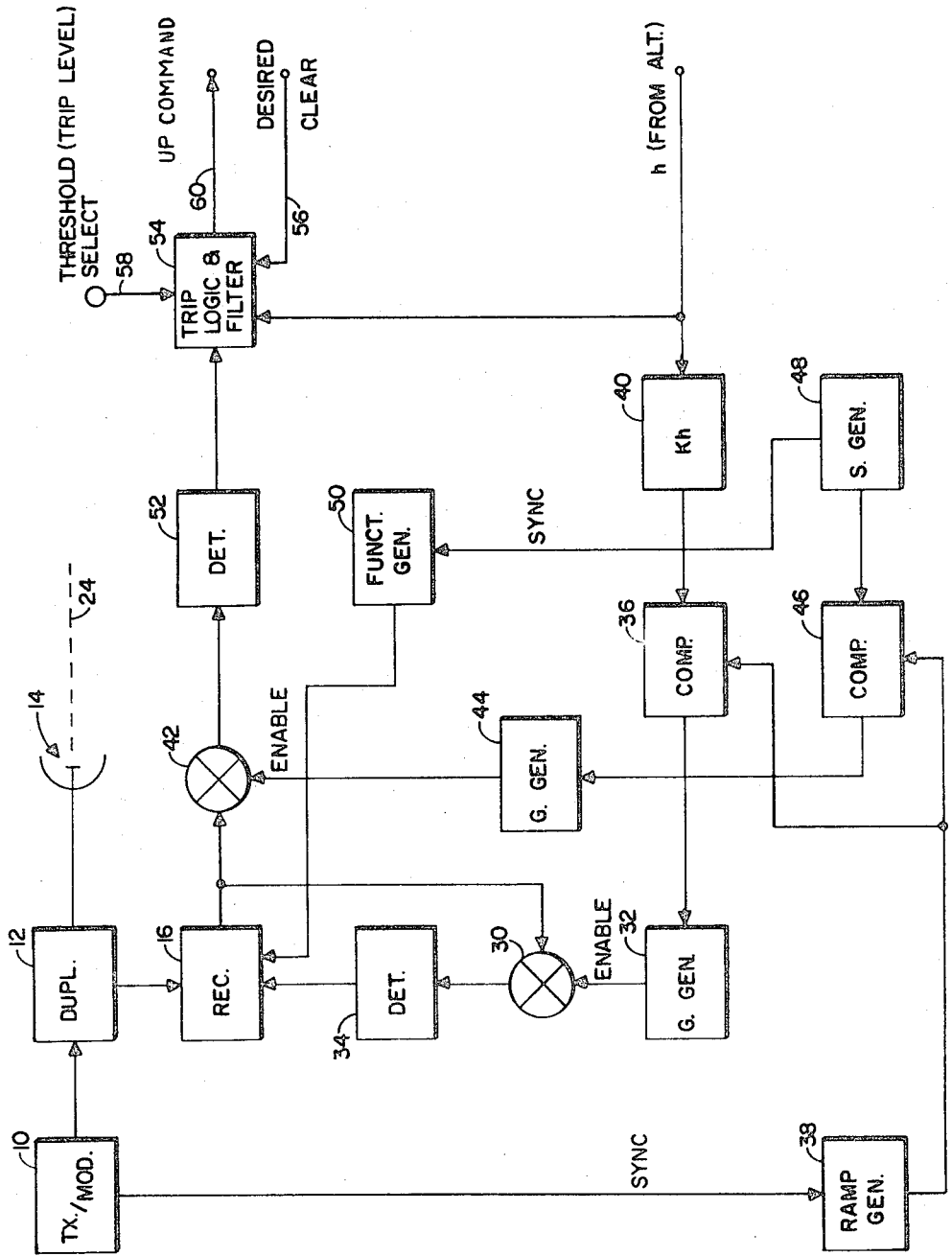
FIGURE 1 is a simplified block diagram of the forward terrain warning system.

The system shown in the block diagram of FIGURE 1 comprises a pulse modulated transmitter 10, a duplexer 12, a forward looking antenna 14, a receiver 16, and various signal processing circuitry. Transmitter 10 generates a series of periodic pulses. The pulses have a predetermined width and a predetermined recurrence frequency. The pulses may have a width of about 0.10 microsecond and have recurrence frequency of about 10,000 cycles per second. The peak power and the recurrence frequency of the pulses generated by transmitter 10 will depend upon the operating range for which the system is designed. For relatively long ranges, the peak power of the pulse must be increased and the recurrence frequency decreased, whereas for relatively short ranges, the peak power can be decreased and the pulse recurrence frequency can be increased. Duplexer 12 interconnects transmitter 10, antenna 14, and receiver 16 and functions to switch the transmitter pulses to antenna 14 and the received pulses to receiver 16. The pulses generated by transmitter 10 are applied to antenna 14 and radiated into space. During normal operation, as shown in FIGURE 2, a wavefront 18 of a transmitted pulse is incident upon terrain 20. Wavefront 18 travels with the speed of light $c$. In FIGURE 2 the wavefront 18 is shown intercepting the terrain 20 at a particular area 22. A certain amount of the energy in wavefront 18 is backscattered from the various areas intercepted, e.g., area 22, and produces a return signal in the receiver 16. Receiver 16, for example, may be a superheterodyne type with a zero IF. The magnitude of this return signal is dependent upon the scattering characteristics of terrain 20, the beam width of antenna 14, the pulse width of the pulses generated by transmitter 10, the power of transmitter 10, the range to a particular interrogated area, such as area 22, and the angular position of the interrogated area relative to the boresight of antenna 14. As shown in FIGURE 2, antenna 14 has a boresight 24 which is aligned with the general LOF of an aircraft 26. If the attitude of the aircraft changes greatly relative to the actual LOF, the antenna will require stabilization. Furthermore, if information relative to the presence or absence of obstacles to either side of LOF is required, an antenna scanning technique must be used. The peak power and width of the pulses generated by transmitter 10, and the beam width of antenna 14 are constants, whereas the scattering characteristics of the terrain 20, the range to a particular interrogated area, and the angular position of the particular interrogated area relative to boresight 24 are variables.

In this system the scattering characteristic of the terrain 20 near the aircraft 26 is monitored by means of the first side lobe 28 of antenna 14. The maximum available gain of receiver 16 is automatically controlled or limited in accordance with the return signal associated with side lobe 28. In other words, the gain of receiver 16 is controlled as a function of the scattering characteristic of the terrain near the aircraft. The gain of receiver 16 is controlled such that its output signal does not vary as a function of the scattering characteristics of terrain 20. Thus as the scattering characteristic increases (decreases) and more energy is backscattered, the gain of receiver 16 is decreased (increased).

The output signal of receiver 16, which is a video signal, is applied to an AND gate 30 along with an enabling gate signal from a gate generator 32. The enabling gate signal generated by gate generator 32 and applied to gate 30 is shown in FIGURE 6. The enabling gate shown in FIGURE 6 occurs at a time corresponding to the horizontal range $Kh$ from the aircraft 26 to the point on terrain 20 where the center of the side lobe 28 intercepts terrain 20. K is a constant and $h$ refers to the altitude of aircraft 26. The range $Kh$ depends upon the altitude of aircraft 26 and the angle side lobe 28 makes with boresight 24. The gated signal resulting from the operation of gate 30 is applied to a detector 34. Detector 34 has the characteristic of assuming the average potential value of each gated signal while the gated signal is present and maintaining this value when the signal is not present. Therefore, the output of detector 34 is a series of potential levels which represent the average level of each gated signal applied to detector 34. The output signal from detector 34 is applied to receiver 16 and automatically controls the gain of receiver 16 to maintain the output of receiver 16 constant with respect to the scattering characteristic as monitored by the return signal associated with side lobe 28. Thus receiver 16 incorporates a form of automatic gain control.

Gate generator 32 generates an enable gate upon being triggered by a signal from a comparator 36. Comparator 36 generates a trigger signal when the signals applied to it are of equal potential. Applying signals to comparator 36 are a ramp generator 38 and a scaling circuit 40. A Sync pulse from transmitter 10 synchronizes ramp generator 38 with the pulses being generated by transmitter 10. The output of ramp generator 38 is a linearly increasing ramp signal initiated each time transmitter 10 generates a pulse. The signal from scaling circuit 40 which is applied to comparator 36 is directly proportional to the altitude of aircraft 26. An altimeter (not shown) provides circuit 40 with an input signal $h$ which is proportional to the altitude of the aircraft. The ramp signal developed by generator 38 corresponds to range. When comparator 36 receives a signal from ramp generator 38 corresponding to a range of $Kh$, comparator 36 generates a trigger which is sent to gate generator 32. Scaling circuit 40 makes the altitude signal $h$ from the altimeter compatible with the output signal developed by ramp generator 38. Scaling circuit 40 could be incorporated either in ramp generator 38 or the altimeter.

The output signal of receiver 16 is also applied to another AND gate 42. Gate 42 is called the range gate. Range gate 42 is enabled with a signal which is swept through the entire interrogation range at a relatively slow rate, for example, 10 cycles per second. Range gate 42 is enabled with a signal provided by a gate generator 44. Gate generator 44 is triggered with a signal developed by a comparator 46, similar to comparator 36. Comparator 46 is provided with input signals from ramp generator 38 and a search generator 48 which generates a linear ramp. The frequency of search generator 48 determines the rate at which the enable signal to range gate 42 is swept through the operating range. The frequency of generator 48, as stated before, is relatively low, for example, 10 cycles per second. Comparator 46 produces a trigger signal which triggers gate generator 44 when the potential of the ramp signal of generator 38 is equal to the potential of the signal developed by generator 48. The enable signal applied to range gate 42 is shown in FIGURE 3. It sweeps or searches through the range of the system at a rate dependent upon the frequency of generator 48, for example, 10 cycles per second.

A function generator 50 is synchronized with search generator 48. The output of function generator 50 is shown in FIGURE 4. The output signal of function generator 50 varies as $R^3$ (range to the third power) and is applied to receiver 16 to vary its gain. The gain of receiver 16 is increased with range in this manner to offset the normal range attenuation. Therefore flat terrain forward of the aircraft will produce a constant amplitude output in receiver 16 for the entire interrogation range (assuming that the scattering characteristic is constant). As a result, the only significant variable remaining which will affect the amplitude of the receiver output as a function of range is the angular position of an interrogated or illuminated area relative to boresight 24 of antenna 14. The gated video signal produced by the action of gate 42 is applied to a detector 52 which is similar to detector 34. The average level of each gated signal out of gate 42 is sensed by detector 52 and maintained at its output. The output of detector 52 is applied to a trip logic and filter circuit 54. Other input signals to circuit 54 are an altitude signal $h$, a desired clearance signal, present on a lead 56, and a threshold select or trip level signal, present on lead 58. The output of circuit 54 is developed on output lead 60 and from there can be sent to a warning device or provide a signal to control surfaces on aircraft 26 causing it to fly upward.

The gain of the system is compensated to make it continuously independent of the range to an interrogated area of terrain and the scattering characteristic of the terrain. The terrain return signal associated with the side lobe 28 is monitored by gate 30, correctly positioned in time, and the gain of receiver 16 is automatically controlled to maintain the side lobe return video signal at a constant level. A predetermined warning threshold level is applied to the trip logic and filter circuit 54 on lead 58. This is called the threshold select signal. The warning threshold level or trip level is established relative to the video signal associated with the side lobe return which is maintained constant at the output of receiver 16. The forward range video signal return associated with the main lobe of the antenna is compared to the established warning threshold level in circuit 54. The return signal associated with the main lobe has the benefit of greater antenna gain than that associated with the side lobe, and therefore the warning threshold level must be scaled upward. For example, the difference in signal level between the side lobe and main lobe returns is about 35 db. Therefore the warning threshold level must be selected to be about 35 db above the level of the constant video signal associated with the side lobe. This warning level can be adjusted downward a nominal amount to produce a warning for terrain somewhat below the line of flight which will compensate for a reasonable noncritical tolerance build up.

Figure 8:
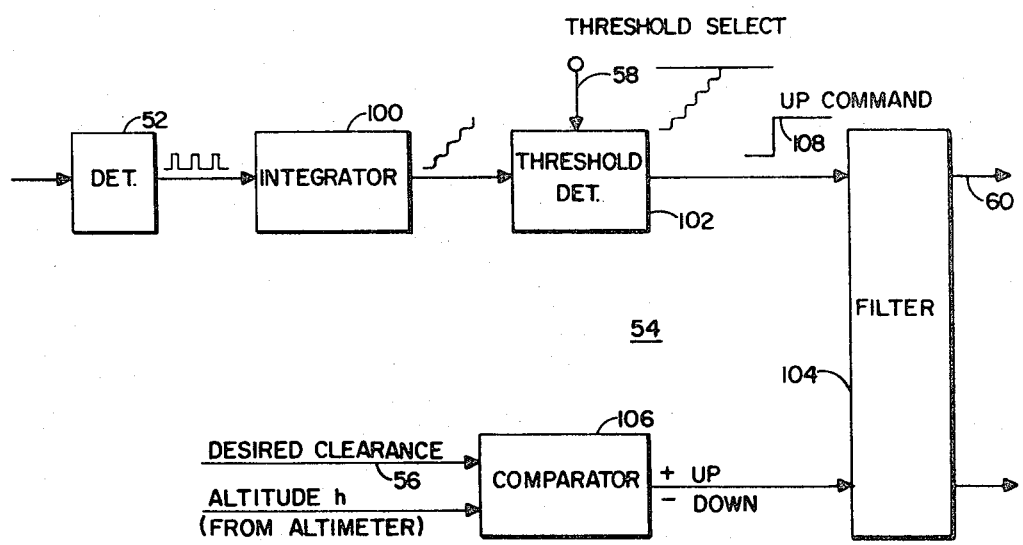
FIGURE 8 is a block diagram of the logic and filter used in the output stages of the system.

FIGURE 8 is a block diagram of the trip logic and filter circuit 54. Circuit 54 comprises an integrator 100, a threshold detector 102, a filter 104, and a comparator 106. The output of detector 52 is connected to the input of integrator 100. The output of detector 52 consists of a series of pulses resulting from the overlap of gating signals from generator 44 and video signals from receiver 16. This overlap is present at gate 42 and occurs at the pulse repetition frequency of the system. The output of integrator 100 is connected to one input of threshold detector 102. The other input to threshold detector 102 is a D-C threshold select voltage present on line 58. Integrator 100 integrates the pulses present at its input and a staircase-like signal is developed at the output of integrator 100. When the staircase signal reaches an amplitude equal to that of the D-C threshold select signal, threshold detector 102 generates an up command 108. Up command 108 is shown in the form of a step function. Up command 108 is processed by filter 104 and after processing appears on line 60. Filter 104 simply sets the time constant or rate at which the various commands, such as the up command 108, can vary the vehicle response. In other words, for example, filter 104 limits the rise time of up command signal 108. Comparator 106 compares a D-C voltage corresponding to a desired clearance with a voltage corresponding to the actual altitude of the aircraft. The desired clearance voltage is present on line 56. The altimeter in which the altitude signal $h$ is developed is not shown. The output of comparator 106 is connected to filter 60 and is either a positive D-C voltage corresponding to an up signal or a negative D-C voltage corresponding to a down signal. The up command 108 from threshold detector 102 will override any command from the comparator 106. Filter 104 acts on the up or down signal from comparator 106 to limit the rate at which this command can vary the response of the vehicle.

As mentioned before, the only significant variable which can affect the amplitude of the output of receiver 16 as a function of range is the angular position of an interrogated area, such as area 22, with respect to the boresight 24 of antenna 14. A typical antenna having a full angle of 15 degrees produces an 8 db decrease in gain as the interrogated area moves from a point on the boresight to a point angularly displaced 8 degrees from the boresight. In moving from a point at 8 degrees from the boresight to another point 15 degrees from the boresight, the gain will be reduced an additional 40 db. It is seen therefore that the operation of this system is based on removing at least to a reasonable degree, all the variables except the angular position from boresight of an interrogated area. In a sense then, the system is an angle detector. When the angle between the boresight 24 of antenna 14 and an interrogated area becomes small enough, a sufficient signal is produced by receiver 16 to activate the trip logic and filter circuit 54 and provide an up command signal or a warning on lead 60. In other words, if the return from a particular interrogation area produces a receiver output of sufficient magnitude to exceed a preselected threshold or trip level, an alarm is sounded which indicates that terrain ahead of the vehicle is approaching the boresight of the antenna which is aligned with the general line of flight of the vehicle. Since the illuminated area being interrogated is continuously a function of the position in time of range gate 42 relative to the firing of transmitter 10, the range to the terrain causing an alarm can be indicated. FIGURE 5 shows the range compensated video envelope at the output of receiver 16.

The system as described has several unique features. At any particular instant only that backscattered energy which falls within range gate 42 is processed. As a result, the effective target cross section of the forward terrain interrogated and scanned by the system is relatively small. The gain of the system is compensated for the normal range attenuation. The gain of the system is also compensated as a function of the scattering characteristic of the terrain near the aircraft. This is accomplished by monitoring the return signal associated with the first side lobe 28 of antenna 14.

Figure 7:
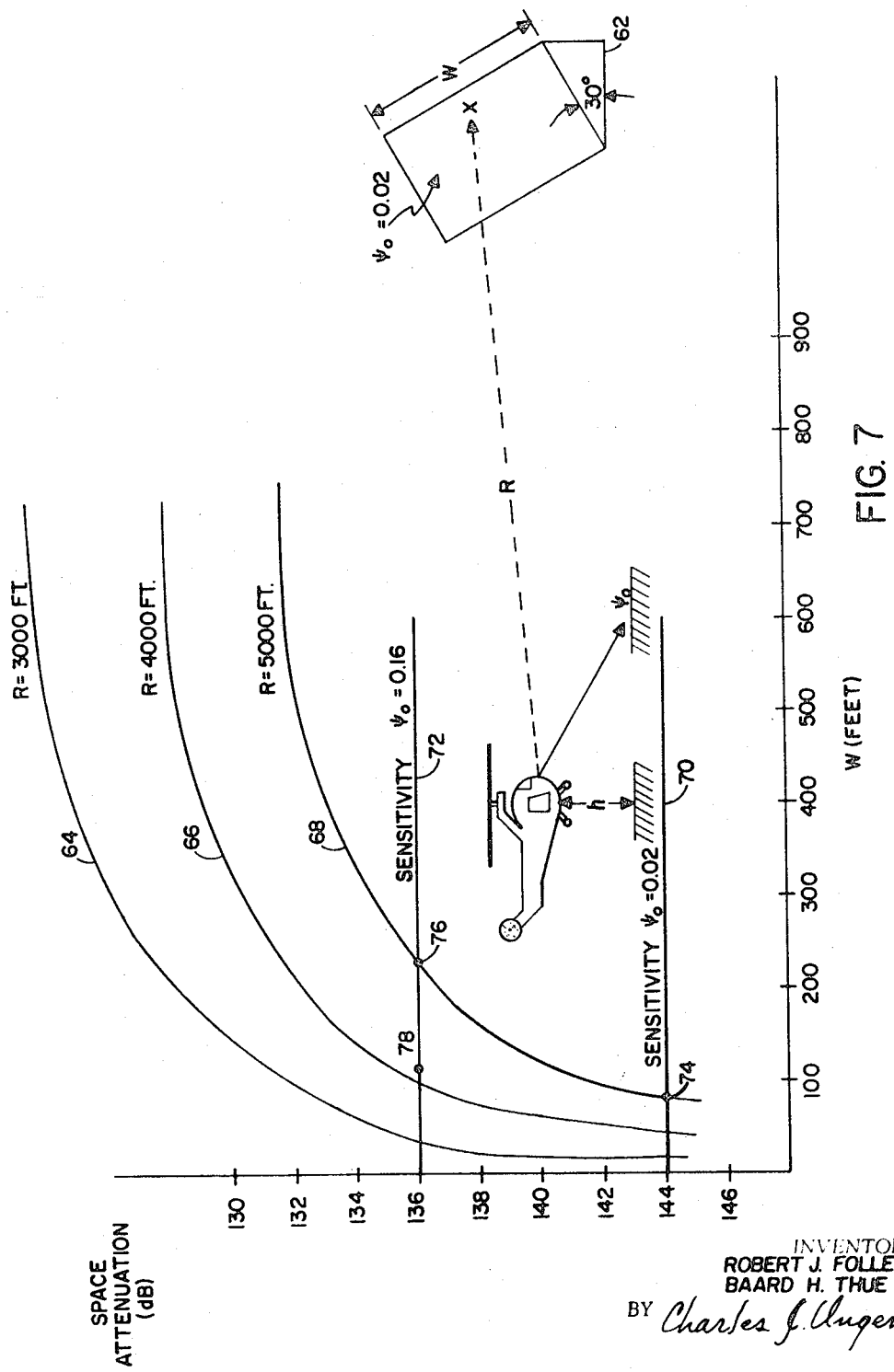
FIG. 7 is a graph showing the relationships between range, required target size, and space attenuation.

A typical forward interrogation range of 5000 feet can be provided with the system. The maximum interrogation range is a function of aircraft altitude, the effective cross section of the interrogated area of the terrain, and the scattering characteristic of the terrain. A ratio of interrogation range to altitude of 50 to 1 will provide an adequate signal to noise ratio for reliable detection of terrain which protrudes to the line of flight of the aircraft. The necessary size of the terrain protruding to the line of flight which will be detected by the system as a function of range, scattering characteristics, and target size, is shown with the aid of FIGURE 7. FIGURE 7 is based on a system which uses an antenna with a 14-degree full angle beam width. An antenna with a gain of 20 db is assumed. As shown in FIGURE 7, the target shape chosen for purposes of illustration is a wedge 62. Wedge 62 has a variable width $w$ and the face of the wedge is separated from its base by an angle of 30 degrees. The wedge has a scattering characteristic $\psi_0$ of 0.02 which corresponds to −17 db. In other words, for every 50 units of energy which are incident upon the face of wedge 62, one unit is scattered back toward the system supplying the energy. This corresponds to a relatively small scattering characteristic. The gain of the system is controlled over a dynamic range of about 10 db as a function of the terrain scattering characteristic monitored in the vicinity of the aircraft by the first side lobe 28 of antenna 14. The graph of FIGURE 7 shows the space attenuation in db as a function of the width $w$ of wedge 62 for various ranges. The three curves in the graph of FIGURE 7 numbered 64, 66 and 68 refer to ranges of 3000 feet, 4000 feet and 5000 feet, respectively. If it is assumed that the scattering characteristic of the terrain near the aircraft is the same as that at the wedge 62, that is 0.02, a relatively low trip sensitivity limit is applicable. The low trip sensitivity limit corresponds to a horizontal line 70 on the graph of FIGURE 7. If the scattering characteristic of the terrain at or near the aircraft is such as to provide the equivalent of a 0.16 scattering characteristic while that at the wedge 62 remains at 0.02, an upper sensitivity limit 0.16 is applicable. The upper limit corresponds to horizontal line 72 on the graph of FIGURE 7. For example, if the target wedge 62 is assumed to be at 5000 feet and it is also assumed that the terrain near the aircraft exhibits a similar scattering characteristic of 0.02, it can be seen that the wedge shaped target would have to have a width $w$ of approximately 75 feet. This information is found by following horizontal line 70 to the left until it intercepts the range curve 68 corresponding to 5000 feet of range at a point 74 and noting that they intercept at a point corresponding to approximately 75 feet on the horizontal scale. On the other hand, if the terrain near the aircraft exhibits a scattering characteristic of 0.16 rather than 0.02 while the scattering characteristic of the target wedge remains at 0.02, a target width of approximately 225 feet is required for detection at a range of 5000 feet. This information is derived by following horizontal line 72 to the left until it intercepts curve 68. This intercept occurs at a point 76 which corresponds to a width of approximately 225 feet on the horizontal scale. Assuming that the last mentioned conditions prevail except that the target wedge 62 has a width of 100 feet rather than 225 feet, it is noted that detection would occur at a range of about 4100 feet. This information is derived by following the vertical line corresponding to a width of 100 feet upward until it intercepts the horizontal line 72. This intercept occurs at a point 78. Point 78 is about 10 percent of the way between curve 66, representing a range of 4000 feet, and curve 68, representing a range of 5000 feet, so that intercept point 78 occurs at a range of about 4100 feet. In summary, a typical capability of the system is to provide forward interrogation and warning of terrain which protrudes to the line of flight at any point between the aircraft and about 5000 feet ahead of the aircraft.

We claim:
1. A system for providing an indication of terrain which is in the line of flight of an airborne vehicle which is in substantially level flight comprising:
   means for transmitting a first set of energy pulses generally along the line of flight and a second set toward the terrain and at a predetermined angle from the first set;
   means for receiving the pulses in each set that are incident upon terrain and scattered back, the receiving means developing a video signal at its output in response to the pulses received and having a gain which can be both controlled and compensated;
   monitoring means connected to the output of the receiving means and developing a signal which is a function of the pulses of energy in the second set that are scattered back from the terrain, the signal thus being a function of the scattering characteristic of the terrain, the signal being applied to the receiving means to control its gain;
   scanning means connected to the output of the receiving means and developing a signal which represents the profile of the terrain along the line of flight;
   compensation means synchronized with the first set of pulses and developing a signal which is applied to the receiving means and varies its gain between successive pulses in the first set in accordance with a predetermined function of time; and,
   alarm means responsive to the signal developed by the scanning means, having a predetermined signal thresh- old, which when exceeded provides an indication that terrain is in the line of flight of the vehicle.

2. The system of claim 1 wherein the means for transmitting and the means for receiving includes an antenna with a radiation pattern having a main lobe and a side lobe, the axis of the side lobe at a predetermined angle from that of the main lobe, the first set of pulses associated with the main lobe and the second set associated with the side lobe.

3. The system of claim 1 wherein the monitoring means comprises:
   a gate circuit connected to the output of the receiving means;
   means for enabling the gate circuit for time intervals at predetermined times after the transmission of a pulse in the first set, the predetermined time being equivalent to the horizontal range to the point on the terrain upon which the second set of pulses is incident;
   means for detecting the video signal present at the receiving means output during the time the gate circuit is enabled, the detector developing a D-C signal which corresponds to the average amplitude of the video signal during enable time intervals, the D-C signal being applied to the receiver to automatically control its gain.

4. The system of claim 3 wherein the means for enabling the gate circuit comprises: a gate generator, developing enable pulses which are applied to the gate circuit when the gate generator is triggered by a comparator, the comparator generating a trigger signal when signals from a ramp generator circuit and a scaler circuit, both connected to the comparator, are equal, the ramp generator developing a linear ramp signal which begins simultaneously with each transmitted pulse in the first set, the scaler circuit developing a signal which is proportional to the altitude of the airborne vehicle 5. The system of claim 1 wherein the scanning means comprises:
   a gating circuit connected to the receiving means output;
   a detector, responsive to the video signal developed by the receiving means and gated by the gating circuit, the detector developing a signal which is proportional to the average amplitude of the gated video signal;
   a search generator developing a periodic linear ramp signal;
   a ramp generator developing a periodic linear ramp signal which is synchronized with the transmitted pulses in the first set, the frequency of the ramp generator greater than that of the search generator;
   a comparator which compares the two ramp signals and generates trigger signals when they are equal; and,
   a gate generator to which the trigger signals are applied, the gate generator developing pulses which are applied to the gating circuit to enable it during the period of the pulses.

6. The system of claim 1 wherein the compensation means comprises:
   a function generator synchronized with the scanning means and developing a signal of the form $t^3$, where $t$ represents time which also corresponds to range, and applying it to the receiver to increase its gain cubicly in correspondence with the scan position and rate of the scanning means.

References Cited

UNITED STATES PATENTS

| | | | |
|---|---|---|---|
| 3,141,161 | 7/1964 | King | 343—7 |
| 3,325,807 | 6/1967 | Burns et al. | |

RODNEY D. BENNETT, JR., Primary Examiner

T. H. TUBBESING, Assistant Examiner